(12) United States Patent
Jia (10) Patent No.: US 8,856,212 B1
(45) Date of Patent: Oct. 7, 2014

(54) WEB-BASED CONFIGURABLE PIPELINE FOR MEDIA PROCESSING

(75) Inventor: Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 580 days.

(21) Appl. No.: 13/206,996

(22) Filed: Aug. 10, 2011

Related U.S. Application Data

(60) Provisional application No. 61/440,825, filed on Feb. 8, 2011.

(51) Int. Cl.
*G06F 15/16* (2006.01)
(52) U.S. Cl.
USPC ........................................................ 709/203
(58) Field of Classification Search
CPC .......... H04N 21/4431; H04N 21/4143; H04N 21/835; H04N 21/8193; H04N 21/818; H04N 21/4325; G06F 17/30056; G06F 17/30058
USPC ................................................ 709/203, 212
See application file for complete search history.

(56) References Cited

U.S. PATENT DOCUMENTS

| | | | |
|---|---|---|---|
| 5,452,435 | A | 9/1995 | Malouf et al. |
| 5,638,114 | A | 6/1997 | Hatanaka et al. |
| 5,731,840 | A | 3/1998 | Kikuchi et al. |
| 5,801,756 | A | 9/1998 | Iizawa |
| 6,021,213 | A | 2/2000 | Helterbrand et al. |
| 6,025,870 | A | 2/2000 | Hardy |
| 6,091,777 | A | 7/2000 | Guetz et al. |
| 6,195,391 | B1 | 2/2001 | Hancock et al. |
| 6,204,847 | B1 | 3/2001 | Wright |
| 6,243,683 | B1 | 6/2001 | Peters |
| 6,266,337 | B1 | 7/2001 | Marco |
| 6,346,963 | B1 | 2/2002 | Katsumi |
| 6,363,067 | B1 | 3/2002 | Chung |
| 6,421,387 | B1 | 7/2002 | Rhee |
| 6,462,791 | B1 | 10/2002 | Zhu |
| 6,483,454 | B1 | 11/2002 | Torre et al. |
| 6,556,588 | B2 | 4/2003 | Wan et al. |
| 6,577,333 | B2 | 6/2003 | Tai et al. |

(Continued)

FOREIGN PATENT DOCUMENTS

| | | |
|---|---|---|
| EP | 01777969 | 4/2007 |
| JP | 0715711 | 1/1995 |
| WO | WO0249356 | 6/2002 |
| WO | WO2008006062 | 1/2008 |

OTHER PUBLICATIONS

U.S. Appl. No. 13/206,986, filed Aug. 10, 2011.
U.S. Appl. No. 13/206,991, filed Aug. 10, 2011.

(Continued)

*Primary Examiner* — David X Yi
(74) *Attorney, Agent, or Firm* — Young Basile Hanlon & MacFarlane P.C.

(57) ABSTRACT

An apparatus and method for a web-based configurable pipeline for media processing is disclosed. The disclosed embodiments include a web browser implemented on a computing device. The web browser includes a web application processor configured to execute instructions included in a web application, and one or more configurable pipelines, wherein a configurable pipeline of the one or more configurable pipelines is created using at least some of the instructions included in the web application, the configurable pipeline including a plurality of components for processing one or more media streams, each component including at least one input or at least one output, and the configurable pipeline is adapted to establish data connections between the plurality of components.

21 Claims, 9 Drawing Sheets

(56) References Cited

U.S. PATENT DOCUMENTS

| | | | |
|---|---|---|---|
| 6,587,985 B1 | 7/2003 | Fukushima et al. |
| 6,681,362 B1 | 1/2004 | Abbott et al. |
| 6,684,354 B2 | 1/2004 | Fukushima et al. |
| 6,707,852 B1 | 3/2004 | Wang |
| 6,711,209 B1 | 3/2004 | Lainema et al. |
| 6,732,313 B2 | 5/2004 | Fukushima et al. |
| 6,741,569 B1 | 5/2004 | Clark |
| 6,812,956 B2 | 11/2004 | Ferren et al. |
| 6,816,836 B2 | 11/2004 | Basu et al. |
| 6,918,077 B2 | 7/2005 | Fukushima et al. |
| 6,952,450 B2 | 10/2005 | Cohen |
| 7,007,098 B1 | 2/2006 | Smyth et al. |
| 7,007,235 B1 | 2/2006 | Hussein et al. |
| 7,015,954 B1 | 3/2006 | Foote et al. |
| 7,124,333 B2 | 10/2006 | Fukushima et al. |
| 7,178,106 B2 | 2/2007 | Lamkin et al. |
| 7,180,896 B1 | 2/2007 | Okumura |
| 7,197,070 B1 | 3/2007 | Zhang et al. |
| 7,219,062 B2 | 5/2007 | Colmenarez et al. |
| 7,263,644 B2 | 8/2007 | Park et al. |
| 7,356,750 B2 | 4/2008 | Fukushima et al. |
| 7,372,834 B2 | 5/2008 | Kim et al. |
| 7,376,880 B2 | 5/2008 | Ichiki et al. |
| 7,379,653 B2 | 5/2008 | Yap et al. |
| 7,424,056 B2 | 9/2008 | Lin et al. |
| 7,447,235 B2 | 11/2008 | Luby et al. |
| 7,447,969 B2 | 11/2008 | Park et al. |
| 7,484,157 B2 | 1/2009 | Park et al. |
| 7,577,898 B2 | 8/2009 | Costa et al. |
| 7,636,298 B2 | 12/2009 | Miura et al. |
| 7,664,185 B2 | 2/2010 | Zhang et al. |
| 7,664,246 B2 | 2/2010 | Krantz et al. |
| 7,680,076 B2 | 3/2010 | Michel et al. |
| 7,684,982 B2 | 3/2010 | Taneda |
| 7,710,973 B2 | 5/2010 | Rumbaugh et al. |
| 7,735,111 B2 | 6/2010 | Michener et al. |
| 7,739,714 B2 | 6/2010 | Guedalia |
| 7,756,127 B2 | 7/2010 | Nagai et al. |
| 7,797,274 B2 | 9/2010 | Stratheam et al. |
| 7,822,607 B2 | 10/2010 | Aoki et al. |
| 7,823,039 B2 | 10/2010 | Park et al. |
| 7,860,718 B2 | 12/2010 | Lee et al. |
| 7,864,210 B2 | 1/2011 | Kennedy |
| 2002/0085637 A1 | 7/2002 | Henning |
| 2002/0140851 A1 | 10/2002 | Laksono |
| 2002/0152318 A1 | 10/2002 | Menon et al. |
| 2002/0157058 A1 | 10/2002 | Ariel et al. |
| 2002/0176604 A1 | 11/2002 | Shekhar et al. |
| 2002/0191072 A1 | 12/2002 | Henrikson |
| 2003/0012287 A1 | 1/2003 | Katsavounidis et al. |
| 2003/0016630 A1 | 1/2003 | Vega-Garcia et al. |
| 2003/0098992 A1 | 5/2003 | Park et al. |
| 2003/0226094 A1 | 12/2003 | Fukushima et al. |
| 2003/0229822 A1 | 12/2003 | Kim et al. |
| 2003/0229900 A1 | 12/2003 | Reisman |
| 2004/0105004 A1 | 6/2004 | Rui et al. |
| 2004/0165585 A1 | 8/2004 | Imura et al. |
| 2004/0172252 A1 | 9/2004 | Aoki et al. |
| 2004/0172255 A1 | 9/2004 | Aoki et al. |
| 2004/0184444 A1 | 9/2004 | Aimoto et al. |
| 2004/0196902 A1 | 10/2004 | Faroudja |
| 2004/0233938 A1 | 11/2004 | Yamauchi |
| 2005/0041150 A1 | 2/2005 | Gewickey et al. |
| 2005/0076272 A1 | 4/2005 | Delmas et al. |
| 2005/0117653 A1 | 6/2005 | Sankaran |
| 2005/0125734 A1 | 6/2005 | Mohammed et al. |
| 2005/0154965 A1 | 7/2005 | Ichiki et al. |
| 2005/0180415 A1 | 8/2005 | Cheung et al. |
| 2005/0185715 A1 | 8/2005 | Karczewicz et al. |
| 2005/0251856 A1 | 11/2005 | Araujo et al. |
| 2005/0259729 A1 | 11/2005 | Sun |
| 2006/0039470 A1 | 2/2006 | Kim et al. |
| 2006/0066717 A1 | 3/2006 | Miceli |
| 2006/0146940 A1 | 7/2006 | Gomila et al. |
| 2006/0150055 A1 | 7/2006 | Quinard et al. |
| 2006/0153217 A1 | 7/2006 | Chu et al. |
| 2006/0215752 A1 | 9/2006 | Lee et al. |
| 2006/0247927 A1 | 11/2006 | Robbins et al. |
| 2006/0248563 A1 | 11/2006 | Lee et al. |
| 2006/0282774 A1 | 12/2006 | Covell et al. |
| 2006/0291475 A1 | 12/2006 | Cohen |
| 2007/0036354 A1 | 2/2007 | Wee et al. |
| 2007/0064094 A1 | 3/2007 | Potekhin et al. |
| 2007/0080971 A1 | 4/2007 | Sung |
| 2007/0081522 A1 | 4/2007 | Apelbaum |
| 2007/0081587 A1 | 4/2007 | Raveendran et al. |
| 2007/0097257 A1 | 5/2007 | El-Maleh et al. |
| 2007/0121100 A1 | 5/2007 | Divo |
| 2007/0168824 A1 | 7/2007 | Fukushima et al. |
| 2007/0195893 A1 | 8/2007 | Kim et al. |
| 2007/0223529 A1 | 9/2007 | Lee et al. |
| 2007/0237226 A1 | 10/2007 | Regunathan et al. |
| 2007/0237232 A1 | 10/2007 | Chang et al. |
| 2007/0250754 A1 | 10/2007 | Costa et al. |
| 2007/0268964 A1 | 11/2007 | Zhao |
| 2007/0285505 A1 | 12/2007 | Korneliussen |
| 2008/0037624 A1 | 2/2008 | Walker et al. |
| 2008/0043832 A1 | 2/2008 | Barkley et al. |
| 2008/0072267 A1 | 3/2008 | Monta et al. |
| 2008/0101403 A1 | 5/2008 | Michel et al. |
| 2008/0109707 A1 | 5/2008 | Dell et al. |
| 2008/0126278 A1 | 5/2008 | Bronstein et al. |
| 2008/0134005 A1 | 6/2008 | Izzat et al. |
| 2008/0144553 A1 | 6/2008 | Shao et al. |
| 2008/0209300 A1 | 8/2008 | Fukushima et al. |
| 2008/0250294 A1 | 10/2008 | Ngo et al. |
| 2008/0260042 A1 | 10/2008 | Shah et al. |
| 2008/0270528 A1 | 10/2008 | Girardeau et al. |
| 2009/0006927 A1 | 1/2009 | Sayadi et al. |
| 2009/0007159 A1* | 1/2009 | Rangarajan et al. ......... 719/328 |
| 2009/0010325 A1 | 1/2009 | Nie et al. |
| 2009/0013086 A1 | 1/2009 | Greenbaum |
| 2009/0022157 A1 | 1/2009 | Rumbaugh et al. |
| 2009/0031390 A1 | 1/2009 | Rajakarunanayake et al. |
| 2009/0059917 A1 | 3/2009 | Lussier et al. |
| 2009/0080510 A1 | 3/2009 | Wiegand et al. |
| 2009/0103635 A1 | 4/2009 | Pahalawatta |
| 2009/0122867 A1 | 5/2009 | Mauchly et al. |
| 2009/0125812 A1 | 5/2009 | Blinnikka et al. |
| 2009/0138784 A1 | 5/2009 | Tamura et al. |
| 2009/0144417 A1 | 6/2009 | Kisel et al. |
| 2009/0161763 A1 | 6/2009 | Rossignol et al. |
| 2009/0241147 A1 | 9/2009 | Kim et al. |
| 2009/0249158 A1 | 10/2009 | Noh et al. |
| 2009/0276686 A1 | 11/2009 | Liu et al. |
| 2009/0276817 A1 | 11/2009 | Colter et al. |
| 2009/0322854 A1 | 12/2009 | Ellner |
| 2010/0040349 A1 | 2/2010 | Landy |
| 2010/0077058 A1 | 3/2010 | Messer |
| 2010/0122127 A1 | 5/2010 | Oliva et al. |
| 2010/0149301 A1 | 6/2010 | Lee et al. |
| 2010/0153828 A1 | 6/2010 | De Lind Van Wijngaarden et al. |
| 2010/0171882 A1 | 7/2010 | Cho et al. |
| 2010/0192078 A1 | 7/2010 | Hwang et al. |
| 2010/0202414 A1 | 8/2010 | Malladi et al. |
| 2010/0220172 A1 | 9/2010 | Michaelis |
| 2010/0235820 A1* | 9/2010 | Khouzam et al. .............. 717/148 |
| 2010/0306618 A1 | 12/2010 | Kim et al. |

OTHER PUBLICATIONS

U.S. Appl. No. 13/206,973, filed Aug. 10, 2011.
The Khronos Group Inc. OpenMAX Integration Layer Application Programming Interface Specification. Version 1.12. Copyright, 2008.
Rosenberg, J. D. RTCWEB I-D with thoughts on the framework. Feb. 8, 2011. Retrieved from http://www.ietf.org/mail-archive/web/dispatch/current/msg03383.html on Aug. 1, 2011.
Rosenberg, J.D., et al. An Architectural Framework for Browser based Real-Time Communications (RTC) draft-rosenberg-rtcweb-framework-00. Feb. 8, 2011. Retrieved from http://www.ietf.org/id/draft-rosenberg-rtcweb-framework-00.txt on Aug. 1, 2011.
Chen, Yu, et al., "An Error Concealment Algorithm for Entire Frame Loss in Video Transmission," Picture Coding Symposium, 2004.

(56) References Cited

OTHER PUBLICATIONS

European Search Report for European Patent Application No. 08146463.1 dated Jun. 23, 2009.

Feng, Wu-chi; Rexford, Jennifer; "A Comparison of Bandwidth Smoothing Techniques for the Transmission of Prerecorded Compressed Video", Paper, 1992, 22 pages.

Friedman, et al., "RTP: Control Protocol Extended Reports (RTPC XR)," Network Working Group RFC 3611 (The Internet Society 2003) (52 pp).

Frossard, Pascal; "Joint Source/FEC Rate Selection for Quality-Optimal MPEG-2 Video Delivery", IEEE Transactions on Image Processing, vol. 10, No. 12, (Dec. 2001) pp. 1815-1825.

Hartikainen, E. and Ekelin, S. Tuning the Temporal Characteristics of a Kalman-Filter Method for End-to-End Bandwidth Estimation. IEEE E2EMON. Apr. 3, 2006.

Implementors' Guide; Series H: Audiovisual and Multimedia Systems; Coding of moving video: Implementors Guide for H.264: Advanced video codoing for generic audiovisual services. H.264. International Telecommunication Union. Version 23. Dated Jul. 30, 2010.

International Search Report for International Application No. PCT/EP2009/057252 mailed on Aug. 27, 2009.

JongWon Kim, Young-Gook Kim, HwangJun Song, Tien-Ying Kuo, Yon Jun Chung, and C.-C. Jay Kuo; "TCP-friendly Internet Video Streaming employing Variable Frame-rate Encoding and Interpolation"; IEEE Trans. Circuits Syst. Video Technology, Jan. 2000; vol. 10 pp. 1164-1177.

Korhonen, Jan; Frossard, Pascal; "Flexible forward error correction codes with application to partial media data recovery", Signal Processing: Image Communication vol. 24, No. 3 (Mar. 2009) pp. 229-242.

Li, A., "RTP Payload Format for Generic Forward Error Correction", Network Working Group, Standards Track, Dec. 2007, (45 pp).

Liang, Y.J.; Apostolopoulos, J.G.; Girod, B., "Analysis of packet loss for compressed video: does burst-length matter?," Acoustics, Speech and Signal Processing, 2003. Proceedings. (ICASSP '03). 2003 IEEE International conference on, vol. 5, No., pp. V, 684-7 vol. 5, Apr. 6-10, 2003.

Neogi, A., et al., Compression Techniques for Active Video Content; State University of New York at Stony Brook; Computer Science Department; pp. 1-11.

Overview; VP7 Data Format and Decoder. Version 1.5. On2 Technologies, Inc. Dated Mar. 28, 2005.

Peng, Qiang, et al., "Block-Based Temporal Error Concealment for Video Packet Using Motion Vector Extrapolation," IEEE 2003 Conference of Communications, Circuits and Systems and West Sino Expositions, vol. 1, No. 29, pp. 10-14 (IEEE 2002).

Roca, Vincent, et al., Design and Evaluation of a Low Density Generator Matrix (LDGM) Large Block FEC Codec, INRIA Rhone-Alpes, Planete project, France, Date Unknown, (12 pp).

Scalable Video Coding, SVC, Annex G extension of H264.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communication and Image Processing 1990, 9 pp.

Strobach, Peter; "Tree-Structured Scene Adaptive Coder", IEEE Transactions on Communications, vol. 38, No. 4, Apr. 1990, 10 pp.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Yan, Bo and Gharavi, Hamid, "A Hybrid Frame Concealment Algorithm for H.264/AVC," IEEE Transactions on Image Processing, vol. 19, No. 1, pp. 98-107 (IEEE, Jan. 2010).

Yoo, S. J.B., "Optical Packet and burst Switching Technologies for the Future Photonic Internet," Lightwave Technology, Journal of, vol. 24, No. 12, pp. 4468, 4492, Dec. 2006.

Yu, Xunqi, et al; "The Accuracy of Markov Chain Models in Predicting Packet-Loss Statistics for a Single Multiplexer", IEEE Transaactions on Information Theory, vol. 54, No. 1 (Jan. 2008) pp. 489-501.

\* cited by examiner

WEB-BASED CONFIGURABLE PIPELINE FOR MEDIA PROCESSING

CROSS REFERENCE TO RELATED APPLICATIONS

This application claims priority to U.S. Provisional Patent Application Ser. No. 61/440,825, filed Feb. 8, 2011, which is incorporated herein in its entirety.

TECHNICAL FIELD

The present invention relates in general to web-based processing of media and in particular to a web-based configurable pipeline for media processing.

BACKGROUND

In the early stages of the World Wide Web (WWW), web pages generally consisted of static content (such as text and images) stored on servers. The static content was accessed and rendered by a web browser executing on a client. As the WWW has evolved, much content on the web is now dynamically generated. Such content can include web applications that include instructions to be performed by the client web browsers. Such web applications can provide a more interactive and functional experience than earlier web pages. More recent web applications now include various forms of media, including audio and video content.

SUMMARY

Disclosed herein are embodiments of methods and apparatuses for a web-based configurable pipeline for media processing.

One aspect of the disclosed embodiments is a web browser implemented on a computing device. The web browser includes a web application processor configured to execute instructions included in a web application, and one or more configurable pipelines, wherein a configurable pipeline of the one or more configurable pipelines is created using at least some of the instructions included in the web application, the configurable pipeline including a plurality of components for processing one or more media streams and each component including at least one input or at least one output. The configurable pipeline is adapted to establish data connections between the plurality of components.

Another aspect of the disclosed embodiments is a media stream processing system for processing a media stream by a web browser. The media stream processing system includes a web application executed by the web browser and at least one configurable decoder pipeline including one or more source inputs for accepting encoded media specified by the web application, one or more processing components for processing the accepted encoded media, and one or more renderers for rendering the accepted encoded media to one or more output devices, wherein at least some of the configurable pipelines are configured to process a media stream by passing data between the components via data channels.

Another aspect of the disclosed embodiments is a method of media stream processing by a web browser. The method includes obtaining a web application by the web browser, creating at least one configurable pipeline that includes a plurality of components, the plurality of components selected based on instructions included in the web application and the configurable pipeline configured to pass data between the components, obtain a media stream, and process the media stream using the at least one configurable pipeline.

Another aspect of the disclosed embodiments is an apparatus for web-based media stream processing. The apparatus comprises a memory and at least one processor configured to execute instructions stored in the memory to obtain a web application by a web browser, create at least one configurable pipeline that includes a plurality of components, the plurality of components selected based on instructions included in the web application and the configurable pipeline being configured to pass data between the components, obtain a media stream, and process the media stream using the at least one configurable pipeline.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Various solutions for including media in web applications include monolithic plugins, such as Adobe Flash and monolithic built-in browser functionality, such as the video tag included in HTML5. These solutions provide a web application high level control over a pre-defined process, such as video encoding or decoding, but do not provide customized or granular control over the process. Custom processes can require, for example, a distinct and custom programmed plugin module for the entire process. Thus, adding proprietary or other custom aspects to a process (such as Digital Rights Management (DRM), advertising overlays, video enhancements, etcetera) can be cumbersome, time-consuming, and costly. To the contrary, a modular configurable pipeline implemented in a web browser can enable a web application to configure custom processes and have granular control over those processes.

Figure 1:
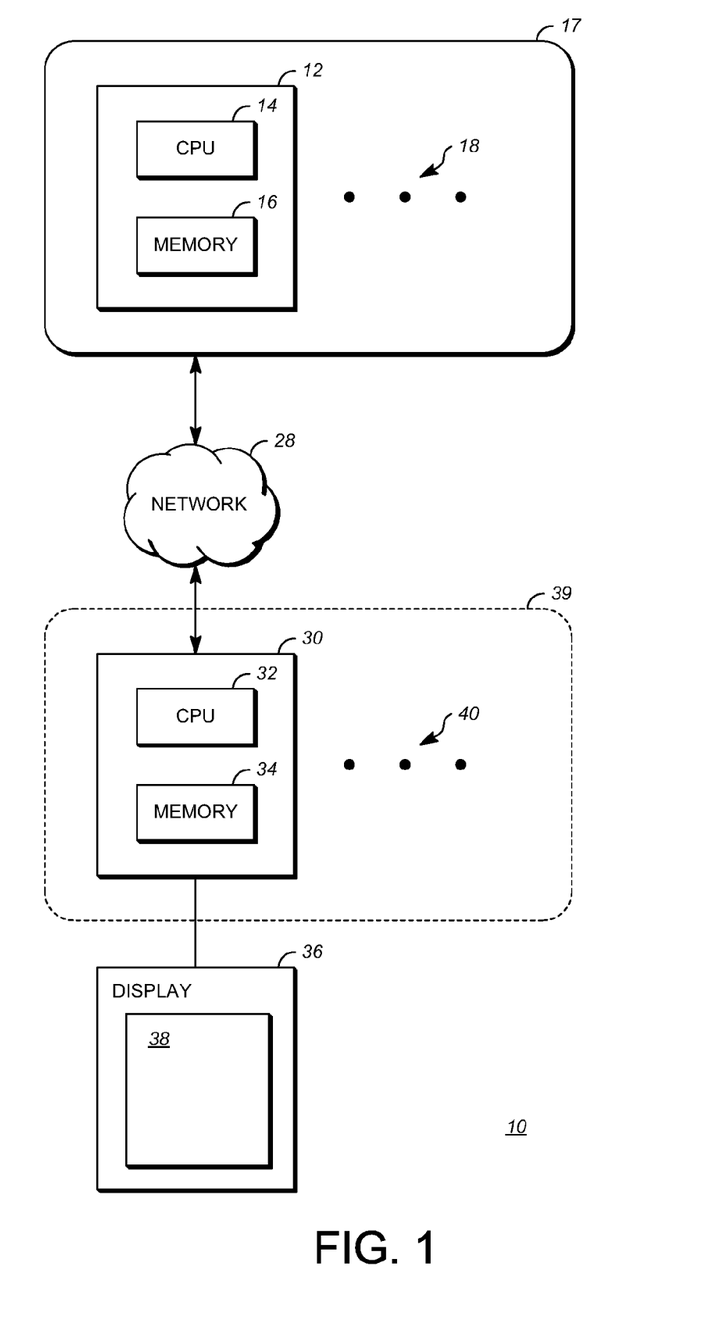
FIG. 1 is a diagram of a client-server computing scheme according to embodiments of the disclosed subject matter.

FIG. 1 is a diagram of a client-server system 10. Server 12 can be, for example, a computer having an internal configuration of hardware including a processor such as a central processing unit (CPU) 14 and a memory 16. CPU 14 can be a controller for controlling the operations of server 12. The CPU 14 is connected to memory 16 by, for example, a memory bus. Memory 16 can include random access memory (RAM) or any other suitable memory device. Memory 16 can store data and program instructions which are used by the CPU 14. Other suitable implementations of server 12 are possible.

The server 12 can be the only server or can be one of a group of servers 17 that includes additional servers 18. The group of servers 17 can be implemented as a computing cluster whereby the server 12 and additional servers 18 share resources, such as storage memory, and load-balance the processing of requests to the group of servers 17. The group of servers 17 can alternatively be a cloud computing service. For example, a cloud computing service can include hundreds or thousands of servers configured to provide scalable computing resources. In a cloud computing service, computing tasks can be performed on one or more servers or other computing devices included within the cloud computing service.

The above are only exemplary implementations of the group of servers 17, and any distributed computing model can be used in their place. As used herein and in the claims, the term "server" is understood to include any combination or implementation of servers, server groups, or any other configuration of computing devices of any kind.

A network 28 connects the servers in the group of servers 17 and a client 30 and any additional clients 40 in a group of clients 39. Network 28 is, for example, the Internet. Network 28 can also be a local area network (LAN), wide area network (WAN), virtual private network (VPN), or any other means of transferring data between the servers 17 and a group of clients 39.

The client 30, in one example, can be a desktop computer having an internal configuration of hardware including a processor such as a central processing unit (CPU) 32 and a memory 34. CPU 32 is a controller for controlling the operations of client 30. CPU 32 can be connected to memory 34 by, for example, a memory bus. Memory 34 may be RAM or any other suitable memory device. Memory 34 stores data and program instructions which are used by CPU 32. Other suitable implementations of client 30 are possible, including handheld computing devices, laptops, or mobile telephones.

A display 36 configured to display a graphical user interface can be connected to client 30. Display 36 may be implemented in various ways, including by a liquid crystal display (LCD) or a cathode-ray tube (CRT). The display 36 can be configured to display application windows including a web browser application window 38 on client 30.

Other implementations of the client-server system 10 are possible. For example, one implementation can omit the group of servers 17 and additional servers 18 and include only a single server 12. In another implementation, there may only be one client 30 instead of the group of clients 39 and additional clients 40. In another implementation, additional components may be added to the encoder and decoder system 10. For example, one or more peripherals, such as a video camera, can be attached to client 30 or some of the additional clients 40.

Figure 2:
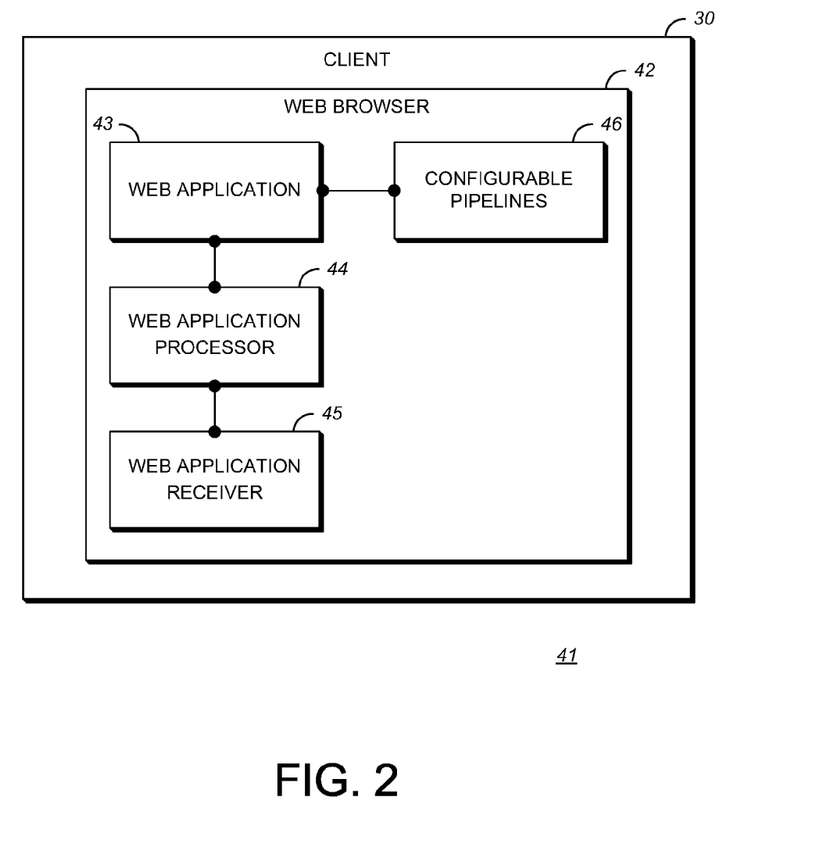
FIG. 2 is a block diagram of a web browser having configurable pipelines implemented within the client-server computing scheme of FIG. 1 according to embodiments of the disclosed subject matter.

FIG. 2 is a block diagram 41 of a web browser 42 having configurable pipelines 46 implemented within the client-server computing scheme of FIG. 1 according to embodiments of the disclosed subject matter. Web browser 42 is implemented on client 30. Web browser 42 can be in the form of computer executable instructions stored in memory 34 and executed by CPU 32. The web browser 42 includes web application 43, web application processor 44, web application receiver 45, and configurable pipelines 46. However, other alternative configurations of web browser 42 can be utilized.

Web application 43 represents a web page that includes content to be executed on client 30 by web browser 42. For example, such content can include scripting, such as JavaScript or ECMAScript. Alternatively, web application 43 can include other content such as Cascading Style Sheets (CSS) or other dynamic content. Web application 43 can be retrieved from a web server implemented on server 12 by way of web application receiver 45. Alternatively, web application 43 can be cached on client 30 and retrieved from client 30 instead of from server 12.

Web application processor 44 can be used to process instructions (such as script) included in web application 43. For example, a JavaScript engine can be included within web application processor 44 to interpret and execute script included in web application 43. Configurable pipelines 46 are used to process media streams by web browser 42. Configurable pipelines 46 can be initialized, configured, and controlled based on instructions (script) included in web application 43. For example, configurable pipelines 46 can be used to decode video and audio streams.

FIG. 2 is a conceptual block diagram depicting an exemplary configuration of a web browser 42 on client 30. Numerous alternative configurations are possible, including those that add to, remove from, and modify the blocks described above.

FIG. 3A-D are conceptual block diagrams of various exemplary pipeline configurations according to embodiments of the disclosed subject matter. One or more configurable pipelines can be created based on these decoder pipeline configurations. These pipeline configurations are for illustrative purposes only and numerous other configurations are possible, contemplated, and expected.

Figure 3A:
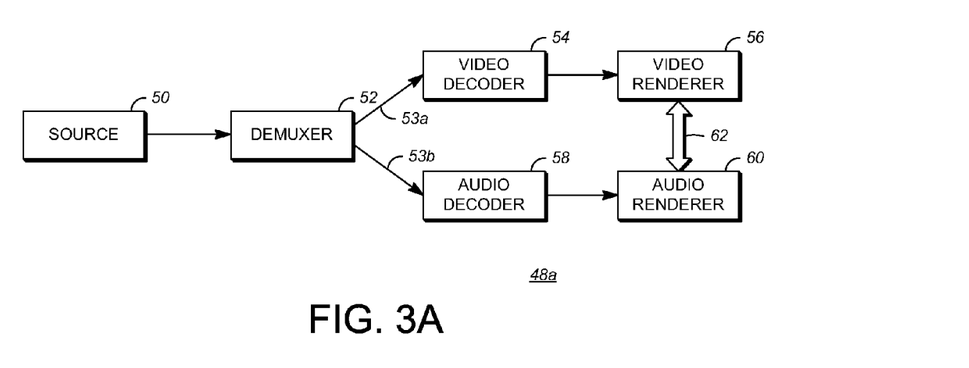
FIG. 3A-D are conceptual block diagrams of various exemplary pipeline configurations according to embodiments of the disclosed subject matter.

FIG. 3A depicts a basic configuration 48a. The basic configuration 48a includes a source 50, demuxer 52, video decoder 54, video renderer 56, audio decoder 58, audio renderer 60, and synchronization 62.

Source 50 is a source input that accepts a media stream. Source 50 can obtain the media stream directly based on a Uniform Resource Locator (URL) or other location provided by, for example, the web application 43. Alternatively, the media stream can be provided to source 50 by another component in web browser 42.

Demuxer 52 is configured to split a media stream into two streams. For example, demuxer 52 can take as input a combined video and audio stream. Demuxer 52 can take the individual video and audio streams and output them separately. In basic configuration 48a, demuxer 52 outputs the video stream as output 53a and the audio stream as output 53b.

Video decoder 54 is configured to decode the video stream output 53a. Video decoder 54 can be capable of decoding video streams encoded using one or more video encoding schemes. Video renderer 56 is configured to take the decoded video stream produced by video decoder 54 and render the decoded video stream to display 36 via, for example, web browser application window 38.

Audio decoder 58 is configured to decode the audio stream output 53b. Audio decoder 58 can be capable of decoding audio streams encoded using one or more audio encoding schemes. Audio renderer 60 is configured to take the decoded audio stream produced by audio decoder 58 and render the decoded audio stream to, for example, an audio card connected to client 30. The audio card can, for example, be connected to speakers or headphones to convert the rendered audio into sound waves. Alternative techniques for rendering audio to sound waves are available.

Synchronization 62 provides for the synchronization of rendering of the audio and video streams. In other words, synchronization 62 can ensure that video is rendered at the same time as the particular audio corresponding to the video so that, for example, a rendered video of a person speaking (i.e. lips moving) is synchronized with the rendered audio. Synchronization 62 can be accomplished using, for example, a clock component 220 as described in FIG. 7 below.

Figure 3B:
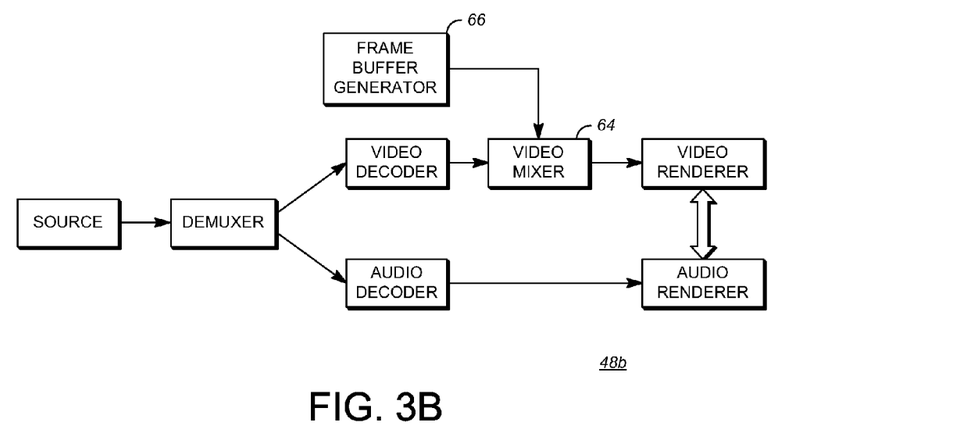

FIG. 3B depicts a mixer configuration 48b. The mixer configuration 48b includes the components of basic configuration 48a plus video mixer 64 and frame buffer generator 66. Video mixer 64 can be configured to combine video from video decoder 54 with images or video from frame buffer generator 66. For example, frame buffer generator 66 can be configured to generate images containing advertisements. Such images can then be overlaid using video mixer 64 such that the video from video decoder 54 is visible in areas where there is not an advertisement. In an alternative implementation, the video mixing can be performed using alpha-blending. In this case, the streams can be overlaid with the appearance of full or partial transparency. Other techniques of video mixing can also be used.

Figure 3C:
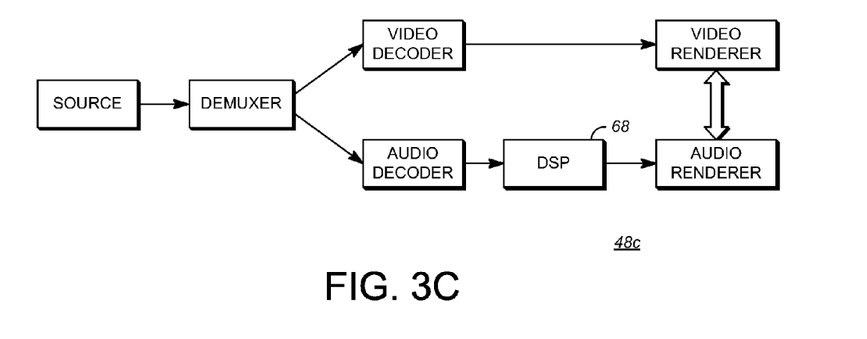

FIG. 3C depicts a post-processing configuration 48c. The post-processing configuration 48c includes the components of basic configuration 48a plus Digital Signal Processing (DSP) 68. DSP 68 can, for example, be configured to take an audio stream output by audio decoder 58 and enhance it by way of digital signal processing.

Figure 3D:
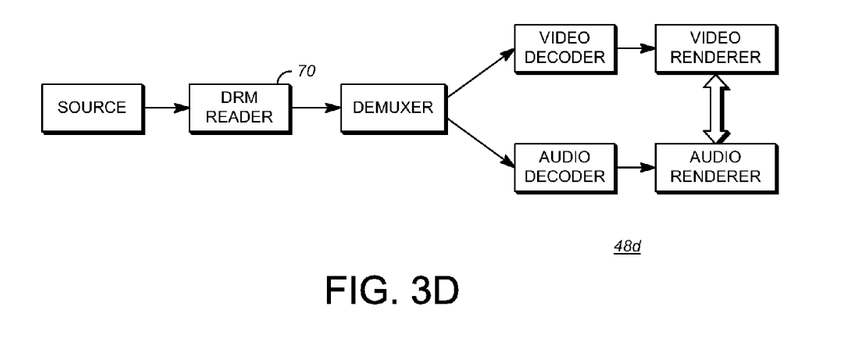

FIG. 3D depicts a digital rights management (DRM) configuration 48d. The DRM configuration 48d includes the components of basic configuration 48a plus DRM reader 70. DRM reader 70 can be configured to accept a media stream that is encoded or encrypted with a DRM scheme. DRM schemes are used to restrict media stream access based on, among other things, user licensing and rights. A component capable of processing one or more DRM schemes, such as DRM reader 70, is needed to read a media stream coded using DRM.

Figure 4A:
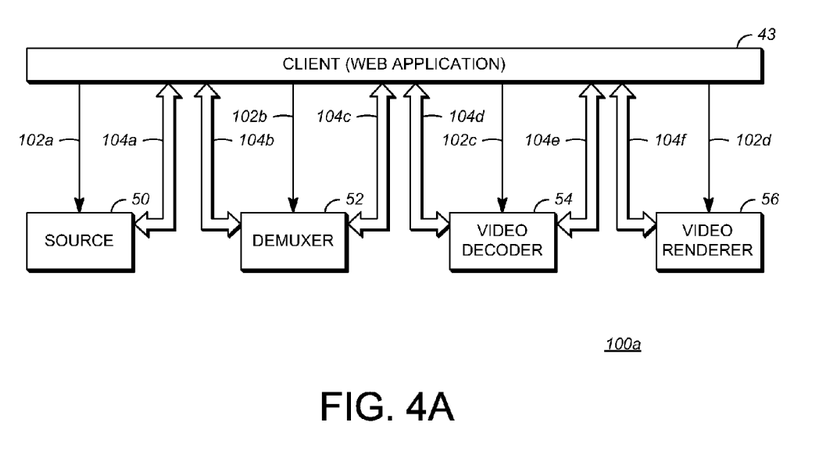
FIG. 4A is a block diagram of an exemplary configurable pipeline including built-in components according to embodiments of the disclosed subject matter.

FIG. 4A is a block diagram of an exemplary basic configurable pipeline 100a including built-in components according to embodiments of the disclosed subject matter. Basic pipeline 100a is controlled by web application 43 and includes source 50, demuxer 52, video decoder 54, and video renderer 56. Also included are control channels 102a-d and data channels 104a-f.

The control channels 102a-d are used to control pipeline 100a. For example, control channels 102a-d can access control functions of the source, components, and renderer of the pipeline to start, stop, pause, fast forward, etc., the processing of the media stream. Control channels 102a-d can include a JavaScript or other interpretive scripting language interface. For example, control channels 102a-d can be accessible by web application 43 via a JavaScript API. In one such implementation, control channels 102a-d are exposed via objects in a document object model (DOM) accessible by the web application 43. In pipeline 100a, control functions are performed individually for each element in the pipeline by web application 43 (i.e. sending a stop control signal to video renderer 56 will not automatically be conveyed to video decoder 54).

The data channels 104a-f are used to pass data between the elements (source, components and renderer) of pipeline 100a. For example, the incoming media stream is output by source 50 via data channel 104a to web application 43. Web application 43 then can pass the data from source 50 via data channel 104b to demuxer 52. In the pipeline configuration of pipeline 100a, the web application 43 passes data as described above between each element of the pipeline 100a.

The components shown in basic pipeline 100a can be implemented by the web browser 42 on client 30 as native binary components. Native binary components are included with web browser 42 and execute natively on the client 30 on which web browser 42 is implemented. In other words, a binary component can be written in a computer programming language such as C++, and then compiled to machine code that is executable natively on the client that is used to execute web browser 42.

Figure 4B:
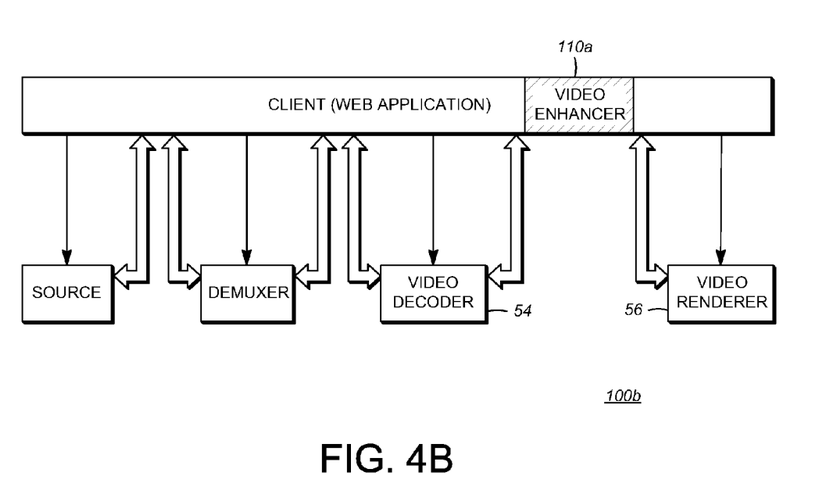
FIG. 4B is a block diagram of an exemplary configurable pipeline including built-in components and an interpretive add-in component according to embodiments of the disclosed subject matter.

FIG. 4B is a block diagram of an exemplary configurable decoder pipeline 100b including built-in components and an interpretive add-in component according to embodiments of the disclosed subject matter. Pipeline 100b includes the components of pipeline 100a, with the addition of video enhancer 110a. Video enhancer 110a is an interpretive add-in component included within web application 43. An interpretive add-in component is one implemented in an interpretive language, such as JavaScript instead of a native binary format. In this case, video enhancer 110a can be included in web application 43 to be used within pipeline 100b.

Web application 43 includes video enhancer 110a in the pipeline 100b by taking data from video decoder 54 via data channel 104e and passing that data to video enhancer 110a. Video enhancer 110a processes the data, and outputs data, which is then passed to video renderer 56 via data channel 104f. In this case, video enhancer 110a is shown, which is a component configured to enhance the decoded video. However, any type of component can be used within the pipeline 100b, including, for example, an advertising overlay component.

The structure of pipeline 100b provides web application 43 access to data input and output of each component in pipeline 100b as well as control of each component. This granular access to the processing pipeline allows great flexibility for a developer of web application 43 to include custom processing steps in, for example, a media stream decoding process.

Figure 4C:
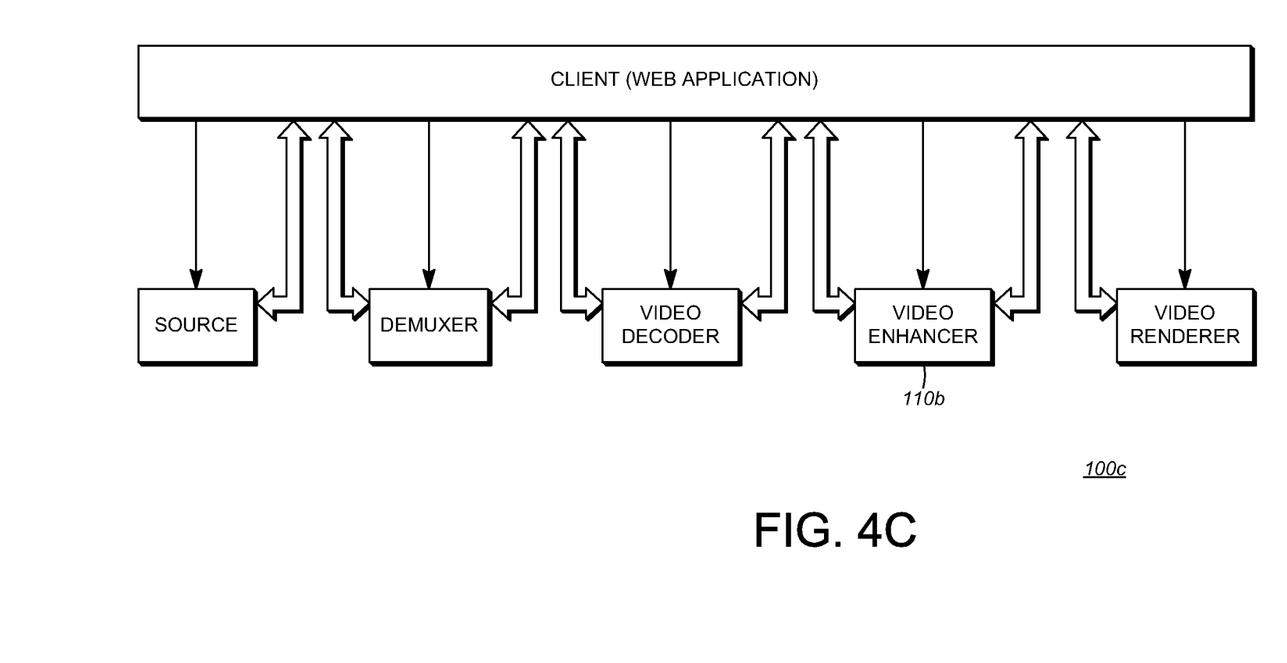
FIG. 4C is a block diagram of an exemplary configurable pipeline including built-in components and a binary add-in component according to embodiments of the disclosed subject matter.

FIG. 4C is a block diagram of an exemplary configurable decoder pipeline 100c including built-in components and a binary add-in component according to embodiments of the disclosed subject matter. Pipeline 100c is similar to pipeline 100b, with the exception of video enhancer 110b. Video enhancer 110b is implemented as a binary add-in component. A binary add-in component is implemented as natively executable code, similar to native binary components. A binary add-in component can be more efficient than an interpretive component because it can execute natively on the client 30.

A binary add-in component can be stored on storage medium accessible via network 28, such as on server 12. The web browser 42 can retrieve the binary add-in component in response to instructions included in web application 43. The binary add-in component and interpretive add-in components can be structured in a common format and can be implemented using one or more standardized Application Programming Interfaces (APIs).

Binary and interpretive add-in components can be used by web application to dynamically change a configurable pipeline in some implementations. For example, video enhancer 110a or 110b could be added into a configurable pipeline for only part of a stream being processed. In another example, video mixer 64 can be added into the configurable pipeline for a certain time period to display advertisements, and then later be removed when the advertisements are no longer shown.

Alternatively, components can be swapped. For example, various implementations of video decoder 54 can be interchanged. A first implementation of video decoder 54 can be configured to decode a first video encoding scheme whereas a second implementation can be configured to decode a second video encoding scheme. The first implementation and second implementation can be interchanged dynamically if the encoding scheme of the stream being decoded changes, or if a new stream with a different encoding scheme is decoded using the configurable pipeline.

Figure 4D:
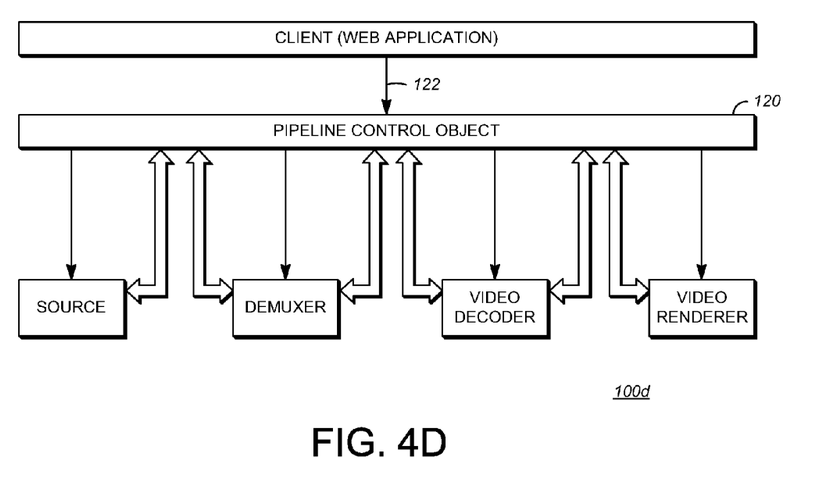
FIG. 4D is a block diagram of an exemplary configurable pipeline including a pipeline control object for controlling the configurable decoder pipeline according to embodiments of the disclosed subject matter.

FIG. 4D is a block diagram of an exemplary configurable pipeline 100d including a pipeline control object 120 for controlling the configurable pipeline 100d according to embodiments of the disclosed subject matter. The pipeline control object 120, which can also be referred to as a pipeline controller, removes granular control of pipeline 100d from the web application 43. Instead, web application 43 can utilize pipeline control channel 122 to control the entire pipeline 100d. The single point of control provided by pipeline control channel 122 can simplify the implementation of web application 43.

The pipeline control channel 122 can be configured to take simple commands from web application 43 and perform more complex control operations with respect to the components of pipeline 100d. In one implementation, pipeline control object 120 is configured with information including: a listing of all components in the configurable pipeline 100d including, for example, the order of components and the type of component; the data passing technique(s) in use; and the functionality of the pipeline (i.e. playback, encoding, etcetera).

Based on the configuration information, pipeline control object 120 can be configured to construct the configurable pipeline during initialization. For example, pipeline control object 120 can instantiate and configure each component and configure the data channels and buffer objects. Once the configurable pipeline is initialized, pipeline control channel 122 can accept commands to control the configurable pipeline.

In one example, pipeline control channel 122 can be configured to accept, for example, "play", "pause", and/or "seek" commands from web application 43. In the instance of "play", pipeline control object 120 can be configured to set each component in the configurable pipeline to the run state. Optionally, a start or other command can be sent to one or more components that require it. In the instance of "pause", pipeline control object 120 can be configured to set each component in the configurable pipeline to the paused state. In the instance of "seek", pipeline control object 120 can be configured to set each component in the configurable pipeline to the pause state, send control signals for each component to flush their input/output ports (i.e. return or deallocate remaining buffer objects), change the location in the stream at the component supplying the stream, and set each component to the run state. Optionally, a start or other command can be sent to one or more components that require it.

Pipeline control channel 122 allows the web application 43 to have a simpler interface to pipeline 100d while still allowing web application 43 to control and configure the components included in pipeline 100d. In one implementation the pipeline control object 120 can be implemented using a native binary module. Such an implementation can improve the efficiency of the pipeline control object 120 as compared to an implementation using, for example, JavaScript.

Figure 4E:
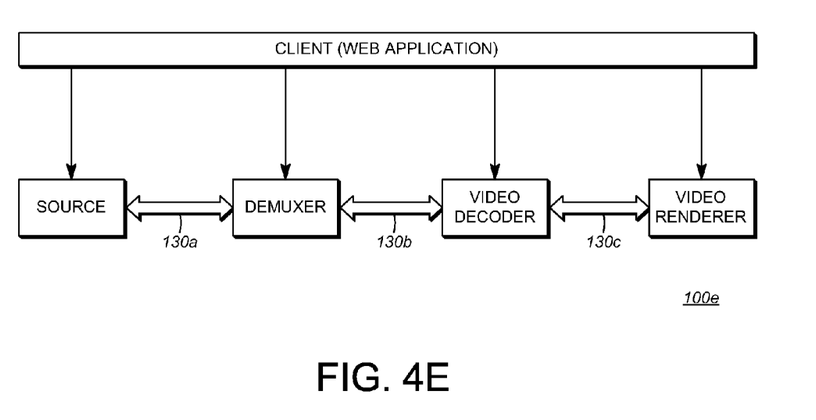
FIG. 4E is a block diagram of an exemplary configurable pipeline including data channels between components in the configurable decoder pipeline according to embodiments of the disclosed subject matter.

FIG. 4E is a block diagram of an exemplary configurable pipeline 100e including data channels between components in the configurable pipeline 100e according to embodiments of the disclosed subject matter. Pipeline 100e is similar to pipeline 100a with the exception that pipeline 100e includes provisions for passing data directly between source, components, and renderer. Data is passed via the data channels 130a-c.

Direct passing of data between elements in the pipeline 100c removes the overhead of having web application 43 pass data from data channel to data channel as is shown in pipeline 100a. Since web application 43 typically processes data using an interpreted scripting language, the improvement in performance by passing data directly between native binary components can be significant. Such an improvement in performance can be useful in applications such as real-time communications. However, the direct passing of data can, in some implementations, prevent the use of an interpretive add-in component. But some implementations may allow for a combination of direct passing of data between pipeline elements and also between pipeline elements and web application 43.

The passing of data via data channels as described with respect to FIGS. 4A-4E can be accomplished using buffer objects. Buffer objects are programming constructs that provide access to memory. Buffer objects can be viewed as a type of memory pointer within web browser 42. Buffer objects can be implemented so that they are accessible using JavaScript by way of the DOM of the web browser 42.

Buffer objects can include some or all of the following elements: data type, data pointer, data size, properties, allocation methods, and accessor methods. The data type of a buffer object indicates what is stored in the memory controlled by the buffer object. For example, data types can include: raw data, compressed stream, uncompressed audio, uncompressed video, etcetera. In some implementations, a buffer object may have a generic data type, wherein any type of data can be stored.

The data pointer can be a memory pointer that includes a memory address of where the buffer object's data is stored. In some implementations, a buffer object may have multiple data pointers. The buffer object also includes at least one data size, which indicates an amount of memory available to the buffer object with reference to the data pointer(s). For example, the data size may be a number of bytes of available memory.

Buffer object properties can be used to describe some aspect of what is stored in its memory. For example, a property of an audio stream can include its sampling rate. In another example, a property of a video stream can include its color space (i.e. RGB, YUV, etcetera). Available properties can be preset based on the data type. Alternatively or additionally, properties can be custom defined for some buffer object implementations.

Allocation methods are used to allocate memory within the buffer object. The allocation method can be called to allocate memory when the buffer object is created, though in some implementations, it can be called at a later time. In some implementations, memory can only be allocated for a buffer object once. However, in other implementations, the memory available in a buffer object can be changed using the allocation methods over time.

Various implementations of accessor methods can be used to access data stored in a buffer object's memory. Some implementations can allow for direct access to the buffer object memory. In this case, the accessor method would return a memory pointer to allow for direct access to memory. However, such an implementation could be platform dependent (i.e. require differing implementations for various operating systems). A more generic implementation could include copying the data stored in the buffer object to a temporary memory location made accessible outside of the buffer object.

Another implementation of accessor methods can include providing access to data on a less granular basis. In other words, data can be made available on a pixel, block, line, frame, or other level depending on the type of data stored by the buffer object. Alternatively, data can be provided as return values from accessor functions of the buffer object. While such accessor functions may provide a less efficient way to access the data, they would provide a more generic and less platform dependent means of accessing the data.

Figure 5:
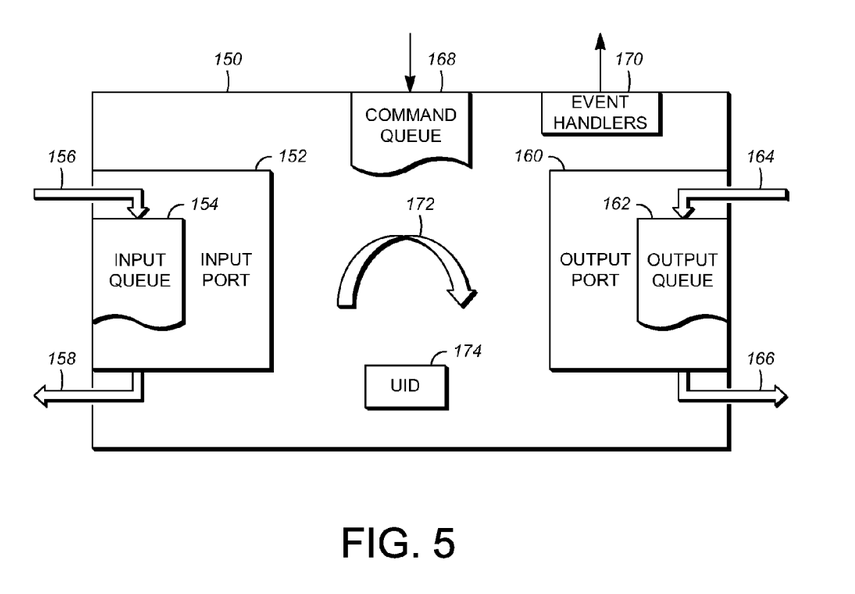
FIG. 5 is a block diagram of an exemplary component according to embodiments of the disclosed subject matter.

FIG. 5 is a block diagram of an exemplary component 150 according to embodiments of the disclosed subject matter. A component is the building block of the pipelines described herein. A component can include any type of processing that involves taking one or more inputs, processing those inputs, and then outputting the results of the processing to one or more outputs. Typically a component will have one input and one output as is shown by exemplary component 150. However in certain situations, it can be advantageous to have multiple inputs and/or multiple outputs. In one example, a demuxer can take a combined audio and video stream, split the audio and video components apart, and output each of the split components to separate outputs. Alternatively, a component can take two video inputs and combine or overlay those inputs into a single output. Either of the above examples can be modified to accommodate combined streams including three or more streams by increasing the number of input or output ports of the component. Depending on a component's purpose, in some implementations, the component can have only inputs (and no outputs) or only outputs (and no inputs).

Exemplary component 150 includes an input port 152. The input port 152 includes an input queue 154, input channel 156, and return channel 158. In one implementation, a circular buffer technique is used to pass data into component 150. The buffer technique includes passing buffer objects into the component via input channel 156. Input queue 154 is used to retrieve the contents of the memory referenced by the buffer objects. Once the contents are retrieved by component 150, the buffer object is returned via return channel 158 so that the memory referenced by the buffer object can be reused. Input port 152 can restrict the type of buffer objects accepted via input channel 156. For example, a video decoder component may only accept a buffer object containing compressed video data.

Exemplary component 150 also includes an output port 160. The output port 160 includes an output queue 162, return channel 164 and output channel 166. In one implementation, a circular buffer technique is used to pass data from component 150. The buffer technique includes passing buffer objects out of the component via output channel 166. The output queue 162 includes buffer objects that are used to store data output by component 150. The buffer objects are sent to the next element in the pipeline by way of output channel 166.

Once the output data is retrieved from the buffer objects, they are returned to component 150 by way of return channel 164 so that they can be reused.

Component 150 can also include a command queue 168 and event handlers 170. Command queue 168 can be configured to accept commands for controlling component 150. For example, command queue 168 can include functionality to accept commands from web application 43 through the use of JavaScript code. Possible commands can include, for example, initializing or otherwise changing the state (described later with respect to FIG. 6) of component 150. A component can have attributes that are configurable by web application 43. For example, an audio encoder component can have attributes including encoding bit rate, codec type, and sampling frequency. In another example, a blurring component can have an attribute defining how much to blur the video passed into the component. Components can be controlled asynchronously or synchronously, depending on the implementation and the component.

Event handlers 170 can be configured to provide information to web application 43 of the current state of component 150 and any events occurring in component 150. For example, event handlers 170 can be configured to notify web application 43 when the state of component 150 changes. In another example, a component 150 implementing a decoder can be configured to notify web application 43 upon a change in resolution, frame rate, or color of the video stream being decoded.

The core of component 150 is its processing module 172. Processing module 172 is used to process data retrieved by input port 152 to be output by output port 160. Processing module 172 can include any process for transforming data. For example, processing module 172 can include a decoder, quality enhancer, discrete cosine transform (DCT), digital rights management (DRM) decoder, color filter, resolution scaler, or any other type of processing module. While a component typically will transform the input data to produce a different output data, some components may not change the input data. For example, a component may be configured to simply inspect the data for a particular condition or occurrence.

A component can have a unique identification code (UID) 174 to allow the component to be identified for instantiation by web application 43. UID 174 can be generated using a UID generation process, or may be issued by a centralized UID repository. However, in some implementations, a UID 174 may not be required if the component is, for example, provided by web application 43.

The implementation of component 150 described is exemplary only and alternative implementations are possible and expected. For example, input port 152 and output port 160 may utilize different techniques of memory management to receive and send data. For example, buffer objects may be passed through the component 150 (i.e. instead of returning the pointer via return channel 158, the pointers are used to output data via output channel 166). In such a technique, once at the end of the configurable pipeline, the buffer object's memory can be deallocated, or the buffer object may be passed back to the beginning of the configurable pipeline. Alternatively, some components may include different numbers of input and/or output ports. In some implementations, processing module 172 can include merely storing some or all of a stream to a device or accessing some or all of a stream from a device.

Figure 6:
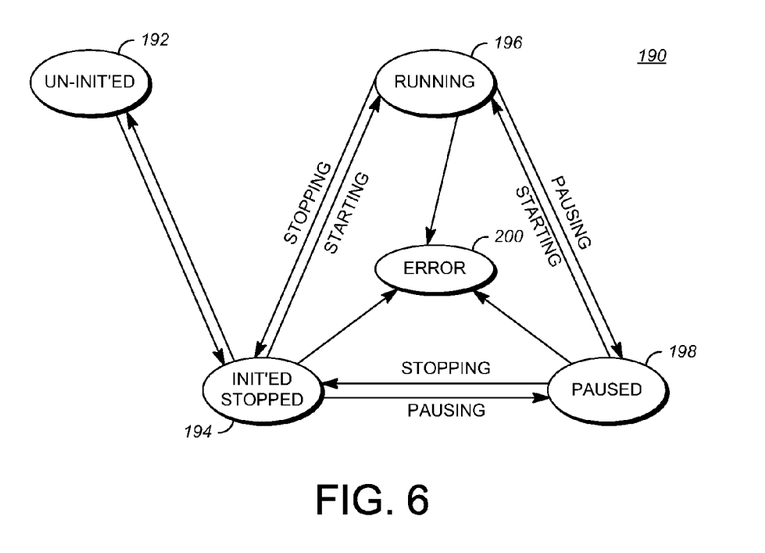
FIG. 6 is an exemplary state diagram relating to the operation of the exemplary component of FIG. 5 according to embodiments of the disclosed subject matter.

FIG. 6 is an exemplary state diagram 190 related to the operation of the exemplary component 150 of FIG. 5 according to embodiments of the disclosed subject matter. Uninitialized component 150 begins in an uninitialized state 192 upon execution. The state of component 150 transitions to initialized/stopped state 194 once the component is initialized. Initialization can include steps such as allocating memory to the input and output ports and initializing variables within component 150. In the initialized/stopped state 194, component 150 does not process, accept, or output data. Once in initialized/stopped state 194, component 150 can transition to any of running state 196, paused state 198, or error state 200.

When in running state 196, component 150 retrieves input data from input port 152, processes the data using processing module 172, and outputs the processed data using output port 160. When in paused state 198, component 150 accepts input data using input port 152, but does not process any of the input data. The component 150 can transition to error state 200 if there is a fatal error and the component is unable to continue to perform normally. When component 150 is in error state 200, web application 43 can be notified by way of, for example, event handlers 170.

The above state diagram 190 is illustrative of only one potential implementation of a component 150. Alternative implementations are possible, including those that add, remove, and modify the states illustrated in state diagram 190.

Figure 7:
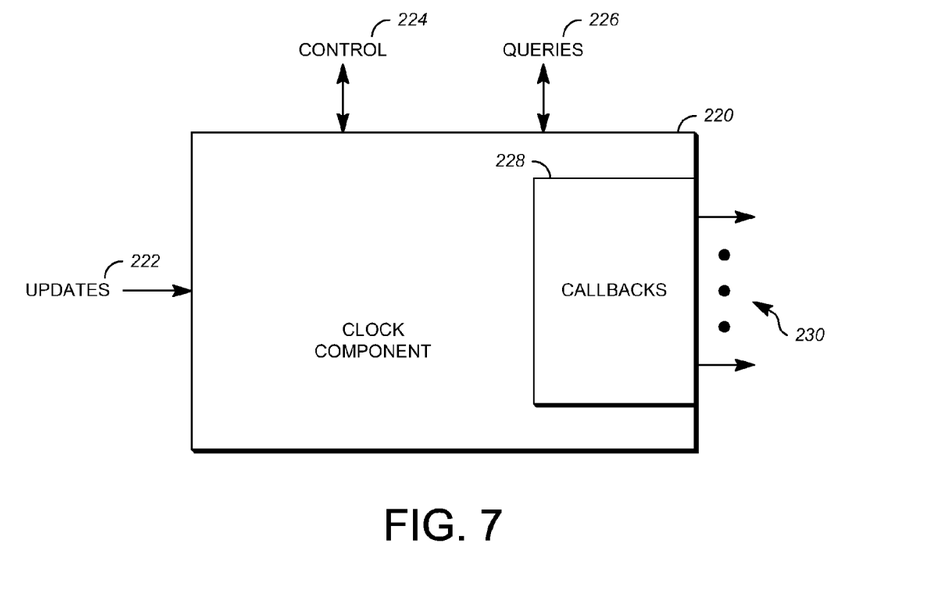
FIG. 7 is a block diagram of an exemplary clock component according to embodiments of the disclosed subject matter.

FIG. 7 is a block diagram of an exemplary clock component 220 according to embodiments of the disclosed subject matter. Clock component 220 provides generic functionality for synchronizing multiple output streams for playback. For example, clock component 220 can be utilized to synchronize the rendering of an output audio stream and an output video stream. In other words, clock component 220 is capable of synchronizing the outputs of various configurable pipelines. This functionality is important to the rendered streams, since the time needed to process and render the various streams through separate configurable pipelines may differ.

In one exemplary implementation, clock component 220 includes updates 222, control 224, queries 226, callback module 228, and callbacks 230. The stream of one configurable pipeline is designated a master stream. The master stream updates clock component 220 via updates 222 with its current media time (i.e. indicating the current location of rendering the stream) and other information that can vary from implementation to implementation. For example, in one implementation, the other information can include playback speed. In a typical implementation, the master stream passes this information to updates 222 on a specific periodic interval. Between the updates, clock component 220 can maintain synchronization using a system clock of client 30. The information can be determined and passed from a renderer component, such as audio renderer 60 for a master audio stream.

Other streams that are to be synchronized by clock component 220 are slave streams output by other configurable pipelines. The slave streams can query for the current media time and other information of the master stream from queries 226 so that the slave streams can synchronize with the master stream. For example, a renderer component, such as video renderer 56 can query information for a slave video stream from queries 226. Alternatively, a renderer component can set up one or more callbacks 230 using callbacks module 228. A callback is a technique whereby a synchronized component can stop processing or "sleep" and be triggered to continue processing by the callback when a particular media time or other condition is reached.

In other implementations, clock component 220 can be used to synchronize streams between components in the same configurable pipeline and before rendering. For example, clock component 220 could be used to synchronize the streams from frame buffer generator 66 and video decoder 54 with respect to mixer configuration 48*b*.

Clock component 220 can be implemented as a native binary component or as an interpretive add-in component. For example, clock component 220 can be included in web browser 42 as a native binary component to improve the efficiency and ease of use of clock component 220. However, clock component 220 can alternatively be implemented as an interpretive add-in component. Such an implementation permits the use of clock component 220, even when a particular web browser 42 does not natively include clock component 220.

Clock component 220 can be accessed and controlled from web application 43 via control 224 having a JavaScript code API accessible via a DOM interface. For example, the web application 43 can initialize, start, stop, or update the playback speed controlled by clock component 220. Clock component 220 can be controlled similarly to other components in the configurable pipeline(s) that it is a part of, including by web application 43 directly and using an intermediate pipeline control object 120.

The embodiments of server 12 and/or client 30 (and the algorithms, methods, instructions etc. stored thereon and/or executed thereby) can be realized in hardware including, for example, IP cores, ASICSs, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server 12 and client 30 do not necessarily have to be implemented in the same manner.

Further, in one example, server 12 or client 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Server 12 and client 30 can, for example, be implemented on computers in a webmail system. Client 30 can be implemented on a device such as a hand-held communications device (i.e. a cell phone). In this instance, server 12 can exchange HTTP communications with the communications device. Other suitable server 12 and client 30 implementation schemes are available. For example, client 30 can be a personal computer rather than a portable communications device.

Implementations or portions of implementations of the above disclosures can take the form of a computer program product accessible from, for example, a computer-usable or computer-readable medium. A computer-usable or computer-readable medium can be any tangible device that can, for example, contain, store, communicate, or transport the program for use by or in connection with any processor. The medium can be, for example, an electronic, magnetic, optical, electromagnetic, or a semiconductor device. Other suitable mediums are also available. Such computer-usable or computer-readable media can be referred to as non-transitory media, and may include RAM or other volatile memory or storage devices that may change over time.

The exemplary approaches herein have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus, comprising:
a processor configured to execute instructions included in a web application accessible through a web browser, the instructions including:
instructions to select a plurality of executable software components, each of the plurality of executable software components including at least one of an input or an output;
instructions to establish data connections with the plurality of executable software components so as to establish a processing order for the plurality of executable software components, wherein each component includes at least one of an input configured to receive input data in the processing order or an output configured to provide output data in the processing order, and the plurality of executable software components and the processing order forming a configurable pipeline, the data connections including:
a plurality of control channels for the plurality of executable software components, each control channel established between the web application and an executable software component of the plurality of executable software components, the plurality of control channels enabling the web application to control the plurality of executable software components; and
a plurality of data channels for the plurality of executable software components, each data channel established between one of the web application and an input or an output of each executable software component, or an input of one executable software component and an output of another executable software component, to pass data between the data channels to form the processing order; and
instructions to process a media stream through the configurable pipeline by decoding or encoding the media stream.

2. The apparatus of claim 1, wherein the configurable pipeline is configured to decode an encoded media stream, wherein:
one or more components of the plurality of executable software components are configured as source inputs for accepting the encoded media stream;
one or more components of the plurality of executable software components are configured for rendering a decoded media stream after processing; and
the remaining components of the plurality of executable software components are configured to decode the encoded media stream into the decoded media stream by processing the encoded media stream.

3. The apparatus of claim 1, wherein the media stream includes audio and video streams and the configurable pipeline includes a demuxer to split the video and audio streams for separate processing.

4. The apparatus of claim 1, wherein the configurable pipeline is configured to encode a raw media stream, wherein:
one or more components of the plurality of executable software components are configured as source inputs for accepting the raw media stream;
one or more components of the plurality of executable software components are configured to output an encoded media stream after processing; and
the remaining components of the plurality of executable software components are configured to encode the raw media stream into the encoded media stream by processing the raw media stream.

5. The apparatus of claim 1, wherein the plurality of executable software components are selected from the group consisting of built-in components, binary add-in components, and interpretive add-in components.

6. The apparatus of claim 1, further comprising:
a web application receiver configured to receive the web application from a web server.

7. The apparatus of claim 1, wherein:
each data channel is established between the web application and the input or the output of each executable software component, the web application configured to pass data between the data channels to form the processing order.

8. The apparatus of claim 1, wherein the instructions include:
instructions to establish a pipeline controller having a pipeline control channel to the web application, the pipeline controller configured to control the configurable pipeline responsive to control signals sent to the pipeline controller from the web application via the pipeline control channel;
and wherein
each data channel is established between the pipeline controller and the input or the output of each executable software component, the pipeline controller configured to pass data between the data channels to form the processing order.

9. The apparatus of claim 1, wherein an intermediate executable software component of the one or more executable software components is an interpretive add-in executable software component, the intermediate executable software component included as instructions and executed within the web application, the intermediate executable software component configured to accept a stream of data output via a source input or component data channel, process the stream of data, and output the processed stream of data to a data channel connected to an input of a executable software component or renderer.

10. The apparatus of claim 1, wherein:
each data channel is established between the input of one executable software component and the output of another executable software component, the plurality of executable software components configured to pass data through the data channels to form the processing order.

11. The apparatus of claim 1, wherein the plurality of components includes a mixer component having a plurality of inputs and configured to combine media from the plurality of inputs into a single output.

12. The apparatus of claim 1, wherein the plurality of executable software components includes a decoder.

13. The apparatus of claim 1, wherein at least one of the plurality of executable software components is an add-in component specified by the instructions included in the web application.

14. The apparatus of claim 13, wherein the plurality of executable software components is provided with an interface to the web browser that is limited to functionality related to processing the media stream in the configurable pipeline.

15. An apparatus, comprising:
a processor configured to execute instructions included in a web application accessible through a web browser, the instructions including:

instructions to establish at least one configurable decoder pipeline, each configurable decoder pipeline including:
- a source input for accepting encoded media specified by the web application,
- a processing component for processing the accepted encoded media, and
- a renderer for rendering the accepted encoded media to one or more output devices;
- a plurality of control channels, each control channel established between the web application and one of the source input, the processing component or the renderer, the plurality of control channels enabling the web application to control the source input, the processing component or the renderer; and
- a plurality of data channels to pass data through the configurable decoder pipeline, each data channel established between one of:
  - the web application and an input or an output of the source input, the processing component or the renderer;
  - an input of the processing component and an output of the source input; or
  - an input of the renderer and an output of the processing component; and instructions to process a media stream through the at least one configurable decoder pipeline, wherein the media stream includes audio and video streams and a first configurable decoder pipeline includes a demuxer to split the video and audio streams for separate processing.

16. A method, comprising:

obtaining a web application by a web browser;

executing, using a processor, instructions of the web application to:
- select a plurality of executable software components, each of the plurality of executable software components including at least one of an input or an output;
- create at least one configurable pipeline that includes the plurality of executable software components by establishing a plurality of control channels, each control channel established between the web application and an executable software component of the plurality of executable software components, the plurality of control channels enabling the web application to control the plurality of executable software components to process a media stream in a processing order; and
- configure the plurality of executable software components to pass data by establishing a plurality of data channels, each data channel established between one of the web application and an input or an output of each executable software component, or an input of one executable software component and an output of another executable software component;

obtaining a media stream; and processing the media stream using the at least one configurable pipeline in the processing order.

17. The method of claim 16, wherein processing the media stream comprises:
controlling each of the plurality of executable software components in the configurable pipeline directly from the web application.

18. The method of claim 17, wherein processing the media stream comprises:
transferring data between the plurality of executable software components in the configurable pipeline via the plurality of data channels, each of the data channels directly connecting an input of a first component of the plurality of executable software components and an output of a second component of the plurality of executable software components.

19. The method of claim 17, wherein processing the media stream comprises:
transferring data between the plurality of executable software components in the configurable pipeline via the plurality of data channels, each of the data channels connecting the input or the output of each executable software component of the plurality of executable software components to the web application, the web application configured to transfer data received from the plurality of data channels between the plurality of executable software components using the plurality of data channels.

20. The method of claim 16, wherein processing the media stream comprises:
controlling each of the plurality of executable software components in the configurable pipeline directly from a pipeline control object; and
controlling the pipeline control object directly from the web application, wherein the pipeline control object is configured to control the plurality of executable software components responsive to the control of the web application.

21. An apparatus, comprising:

a memory; and a processor configured to execute instructions stored in the memory to:
- obtain a web application by a web browser,
- select a plurality of executable software components based on instructions of the web application, each of the plurality of executable software components including at least one of an input or an output;
- create at least one configurable pipeline that includes the plurality of executable software components by establishing a plurality of control channels, each control channel established between the web application and an executable software component of the plurality of executable software components, the plurality of control channels enabling the web application to control the plurality of executable software components to process a media stream in a processing order;
- configure the plurality of executable software components to pass data by establishing a plurality of data channels, each data channel established between one of the web application and an input or an output of each executable software component, or an input of one executable software component and an output of another executable software component;
- obtain a media stream; and
- process the media stream using the at least one configurable pipeline in the processing order.

* * * * *